United States Patent [19]
Hansen et al.

[11] Patent Number: 6,016,537
[45] Date of Patent: Jan. 18, 2000

[54] METHOD AND APPARATUS FOR ADDRESS MULTIPLEXING TO SUPPORT VARIABLE DRAM SIZES

[75] Inventors: John P. Hansen; Robert Paul Gittinger; Ronald W. Stence, all of Austin, Tex.

[73] Assignee: Advanced Micro Devices, Inc., Sunnyvale, Calif.

[21] Appl. No.: 08/813,734

[22] Filed: Mar. 7, 1997

[51] Int. Cl.[7] ...................................................... G06F 12/02
[52] U.S. Cl. ........................................... 711/211; 711/217
[58] Field of Search .................................. 711/105, 211, 711/212, 217, 220; 365/230.02

[56] References Cited

U.S. PATENT DOCUMENTS

| | | | |
|---|---|---|---|
| 4,675,808 | 6/1987 | Grinn et al. ............................. | 364/200 |
| 5,276,812 | 1/1994 | Yamada et al. ......................... | 395/275 |
| 5,420,995 | 5/1995 | Taguri ..................................... | 395/425 |
| 5,590,078 | 12/1996 | Chatter ................................. | 365/189.01 |
| 5,748,977 | 5/1998 | Kawasaki et al. ...................... | 395/800 |

OTHER PUBLICATIONS

Advanced Micro Devices, "Am186™EM and Am188™EM User's Manual with AM186 Instruction Definitions", 1995, pp. 1–1 thru 1–6; 2–1 thru 2–9; 3–1 thru 3–18; 4–1 thru 4–9; 5–1 thru 5–12; 6–1 thru 6–2; 7–1 thru 7–35; and 12–1 thru 12–6.

Advanced Micro Devices, "Am186™EM and Am188™EM High–Performance, 80C186– and 80C188–Compatible, 16–Bit Embedded Microcontrollers", 1996, pp. 29–48, 52–68, and 93–96.

Advanced Micro Devices, "AM186™ES and AM188™ES High–Performance, 80C186– and 80C188–Compatible, 16–Bit Embedded Microcontrollers", 1996, pp. 24–52, and 65–75.

*Primary Examiner*—Eddie P. Chan
*Assistant Examiner*—Kevin Verbrugge
*Attorney, Agent, or Firm*—Zagorin, O'Brien & Graham, LLP

[57] ABSTRACT

Each of a plurality of output circuits is coupled with one pair of a plurality of pairs of adjacent odd and even bits of a sequential group of address bits. The output circuits provide an address bus with the odd address bits during a first time period and with the even address bits during a second time period. The odd address bits are provided as a column address (or a row address) and the even address bits are provided as the row address (or column address).

17 Claims, 6 Drawing Sheets

METHOD AND APPARATUS FOR ADDRESS MULTIPLEXING TO SUPPORT VARIABLE DRAM SIZES

CROSS-REFERENCE TO RELATED APPLICATIONS

This application relates to the following application Ser. No. 08/813,728, entitled "OVERLAPPING PERIPHERAL CHIP SELECT SPACE ON A MICRONCONTROLLER WITH AN INTEGRATED DRAM CONTROLLER", by Gittinger et al.; Ser. No. 08/813,727, now U.S. Pat. No. 5,909,703 issued Jun. 1, 1999 entitled "A METHOD AND APPARATUS FOR BANKING ADDRESSES FOR DRAMS", by Hansen et al.; and allowed Ser. No. 08/813,726, entitled "INTEGRATING A DRAM CONTROLLER ONTO A MICROCONTROLLER", by Gittinger et. al., all of which were filed the same day as the present application and all of which are incorporated herein by reference.

BACKGROUND OF THE INVENTION

1. Field of the Invention

This invention relates to computers and more particularly to addressing of computer memories.

2. Description of the Related Art

Dynamic Random Access Memories (DRAMs) require that the addresses provided to them be split between row and columns. The row address is provided to the DRAM during a first time period and is latched into the DRAM on assertion of the row access strobe (RAS). The column address is multiplexed onto the bus and is latched into the DRAM during a second time period on assertion of the column access strobe (CAS). That address multiplexing allows, e.g., a twenty bit address to be provided to the DRAM using only 10 address pins. DRAMs with various arrangements of row and column addresses are known in the art. For instance, symmetric DRAMs have the same number of bits for rows as for columns. Asymmetric DRAMs have more of either row or column bits than the other. The number of bits in the row and column depends upon the size of the DRAM.

Many DRAM controllers exist to support the different DRAM sizes and configurations. One way DRAM controllers address DRAMs is as follows. Assume a processor has a twenty bit addressing capability (20 bits) and a 256K DRAM, requiring 18 address bits, A18–A1, is connected to the processor. The 256K DRAM has 9 address pins, MA8–MA0. The processor could connect 9 sequential address pins, e.g., A18–A10 to the DRAM. The processor provides the most significant address bits A18–A10, as the row address and the bits A9–A1 as the column address. Table 1 shows the address bits provided to the DRAM on each DRAM address pin MA8–MA0 and which processor pin (PROC PIN) is used to connect to the DRAM.

TABLE 1

| DRAM PIN | MA8 | MA7 | MA6 | MA5 | MA4 | MA3 | MA2 | MA1 | MA0 |
|---|---|---|---|---|---|---|---|---|---|
| PROC PIN | A18 | A17 | A16 | A15 | A14 | A13 | A12 | A11 | A10 |
| ROW | A18 | A17 | A16 | A15 | A14 | A13 | A12 | A11 | A10 |
| COLUMN | A9 | A8 | A7 | A6 | A5 | A4 | A3 | A2 | A1 |

As shown in Table 1, address bits A18 and A9 are provided on the same pin processor pin (A18) to DRAM pin (MA8).

For a different size DRAM, e.g., 1 Mbyte, a 20 bit address may be multiplexed as shown in Table 2.

TABLE 2

| DRAM PIN | MA9 | MA8 | MA7 | MA6 | MA5 | MA4 | MA3 | MA2 | MA1 | MA0 |
|---|---|---|---|---|---|---|---|---|---|---|
| PROC PIN | A20 | A19 | A18 | A17 | A16 | A15 | A14 | A13 | A12 | A11 |
| ROW | A20 | A19 | A18 | A17 | A16 | A15 | A14 | A13 | A12 | A11 |
| COLUMN | A10 | A9 | A8 | A7 | A6 | A5 | A4 | A3 | A2 | A1 |

Table 2, shows that the DRAM controller needs to support a different address multiplexing scheme for the 20 bit address. For instance, A10 has become a column address in Table 2 as compared to a row address in Table 1 and is multiplexed onto pin A20 rather than A10. Additionally, all the other pairs of address bits multiplexed onto an address line have also changed. Thus, the DRAM controller has to provide different configurations in order to support different sizes of DRAMs. Specifically, at a minimum, a DRAM controller has to be able to multiplex different address bits onto multiple output pins and provide appropriate control logic. It would be desirable to be able to support varying DRAM sizes without having to provide the additional logic and levels of control necessary to support varying sizes of DRAMs by the prior art schemes discussed.

SUMMARY OF THE INVENTION

Therefore, the invention provides a method and apparatus which supports varying DRAM sizes without needing different hardware and control configurations to support varying DRAM sizes. The invention provides a method of providing each of a plurality of output circuits with one of a plurality of pairs of adjacent odd and even bits of a sequential group of address bits. The output circuits provide an address with the odd address bits during a first time period and with the even address bits during a second time period. The odd address bits are provided as a column address (or a row address) and the even address bits are provided as the row address (or column address).

The invention also provides a first plurality of output circuits, each output circuit coupled to a respective one of a first group of address bits, the first group of address bits being every other address bit of a sequential group of address bits, beginning with address $A_n$, $n \geq 0$, the first group of output circuits providing the first group of address bits to every other address line of a sequential portion of an address bus. A second plurality of output circuits is coupled to one of the first group of address bits and a respective one of a second group of address bits. The second group of address bits are every other address bit of the sequential group of address bits, beginning with address $A_{n+1}$. Therefore, each of the second plurality of output circuits is provided with one even and one odd address bit, with the one even and one odd address bits being sequential. The second plurality of output circuits are coupled to the address lines of the address bus which are not coupled to the first plurality of output circuits. The second plurality of output circuits includes a selector circuit which selects an address bit of the second group or an address bit of the first group, according to a selection indication. The second plurality of output circuits provides the second group of address bits during a first time period and the first group of address bits during a second time period.

The invention also provides for burst mode access by proving a method and apparatus in which a third plurality of output circuits are each respectively coupled to one bit of a third group of address bits. The third group of address bits is part of a second sequential group of address bits and the third group of address bits is sequential. Each of a fourth plurality of output circuits is coupled to one bit of the third group of address bits and is also coupled to one bit of a fourth group of address bits. The fourth group of address bits is part of the second sequential group of address bits, the fourth group of address bits being sequential. The first and second sequential group of address bits represent an address for a memory location. The fourth plurality of output circuits includes a selector circuit which selects either an address bit of the third group or an address bit of the fourth group, according to a selection indication. The fourth plurality of output circuits provides the fourth group of address bits during the first time period and the third group of address bits during the second time period.

The method and apparatus of the instant invention provides the advantage of easily supporting different sizes of DRAMs. The method and apparatus also provides the advantage of allowing the same address pins to be used for accessing both DRAM and SRAM and other non-multiplexed devices.

BRIEF DESCRIPTION OF THE DRAWINGS

The present invention may be better understood, and its numerous objects, features, and advantages made apparent to those skilled in the art by referencing the accompanying drawings, wherein, the use of the same reference symbols in different drawings indicates similar or identical items.

DESCRIPTION OF THE PREFERRED EMBODIMENT(S)

Figure 1A:
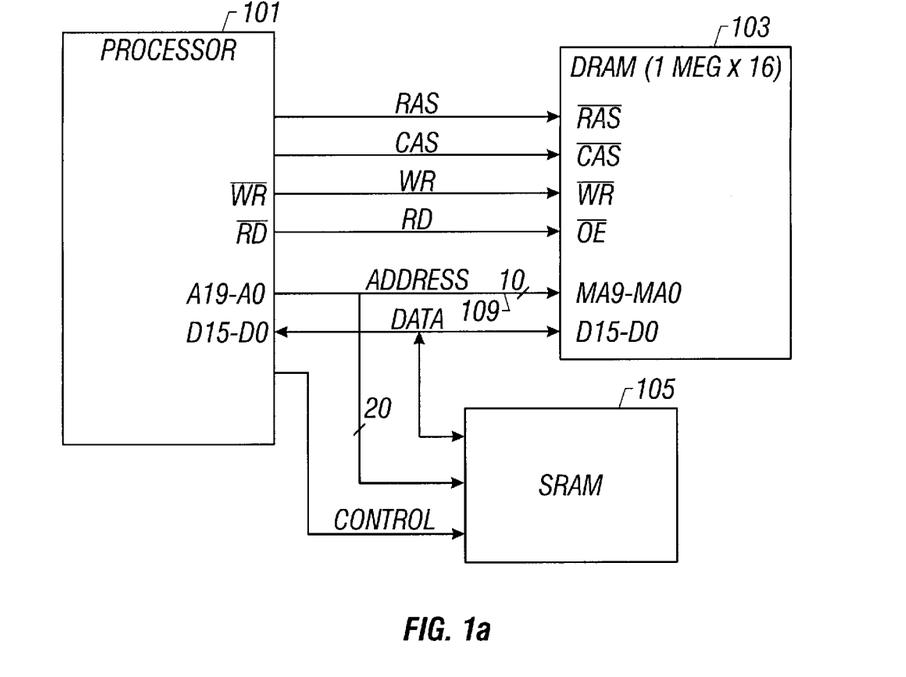
FIG. 1a shows a generic processor and a first memory size connected according to the present invention.

FIG. 1a shows a generic processor and memory according to the present invention. Processor 101 provides address A19–A0 to SRAM 105. The processor also supplies odd/even multiplexed addresses to DRAM 103. DRAM 103 is a 1M DRAM that requires 20 multiplexed address bits. The odd/even multiplexing used on address bus 109 supplying DRAM address pins MA9–MA0 is shown in Table 3a. Note that every odd address pin is driven as a row address and every even address pin is driven as a column address. Each address bit is multiplexed with its nearest neighbor onto a single output pin. For instance, address pins A1 and A0, A3 and A2, A5 and A4, etc., are multiplexed onto one address pin for each pair. For this embodiment, the odd pins are coupled to address pins MA9–MA0 of DRAM 103. Note that all even processor pins could be coupled to the DRAM instead. Additionally, all even address bits could be provided as row addresses and the odd addresses would be column addresses.

TABLE 3a

| DRAM PIN | MA9 | MA8 | MA7 | MA6 | MA5 | MA4 | MA3 | MA2 | MA1 | MA0 |
|---|---|---|---|---|---|---|---|---|---|---|
| PROC PIN | A19 | A17 | A15 | A13 | A11 | A9 | A7 | A5 | A3 | A1 |
| ROW ADDR | A19 | A17 | A15 | A13 | A11 | A9 | A7 | A5 | A3 | A1 |
| COLUMN | A18 | A16 | A14 | A12 | A10 | A8 | A6 | A4 | A2 | A0 |

An alternative embodiment is shown in Table 3b where the column address (e.g., A18) is the adjacent address above the row address (A17) address rather than the adjacent address below as in Table 3a. Note that the most significant address bit is driven twice because for that embodiment A19 is the most significant bit.

TABLE 3b

| DRAM PIN | MA9 | MA8 | MA7 | MA6 | MA5 | MA4 | MA3 | MA2 | MA1 | MA0 |
|---|---|---|---|---|---|---|---|---|---|---|
| PROC PIN | A19 | A17 | A15 | A13 | A11 | A9 | A7 | A5 | A3 | A1 |
| ROW ADDR | A19 | A17 | A15 | A13 | A11 | A9 | A7 | A5 | A3 | A1 |
| COLUMN | A19 | A18 | A16 | A14 | A12 | A10 | A8 | A6 | A4 | A2 |

Figure 1B:
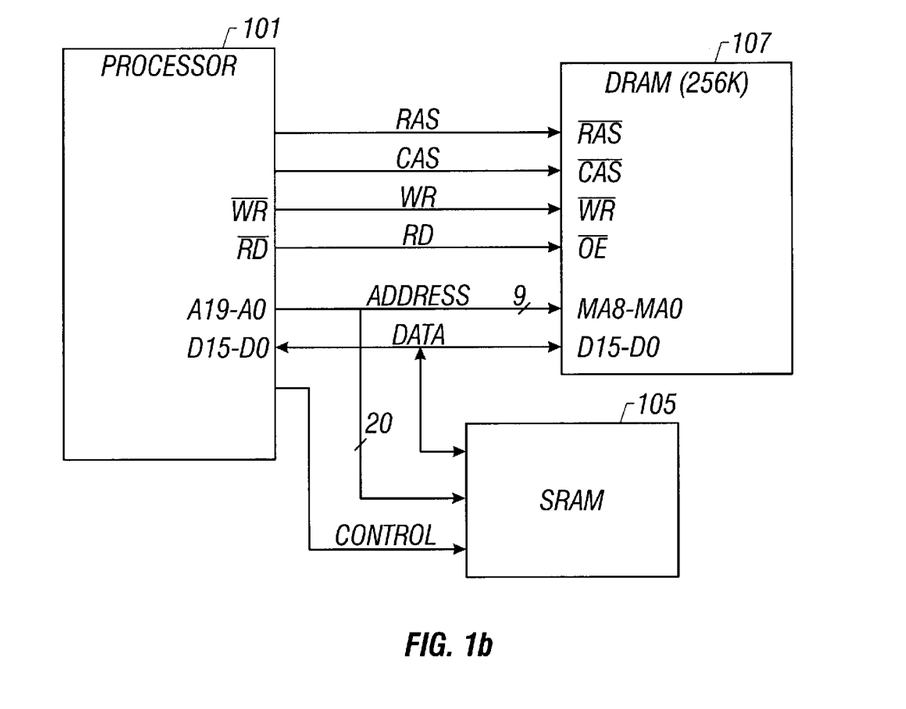
FIG. 1b shows the generic processor coupled to a different sized memory.

FIG. 1b shows the same system as FIG. 1a, except that processor 101 is now connected to DRAM 107 which is 256K and requires only 9 address lines (18 multiplexed address bits). A 1 Megabyte SRAM is still connected to processor 101. Because of the addressing scheme taught by the instant invention, the processor 101 can support the smaller DRAM 107 with minimum impact. The most significant two address bits A18 and A19 provided to pin MA9 of DRAM 103 are simply not connected to the smaller DRAM 107. Thus, various size DRAMs can be connected to a processor using the addressing scheme of the instant invention.

Figure 2:
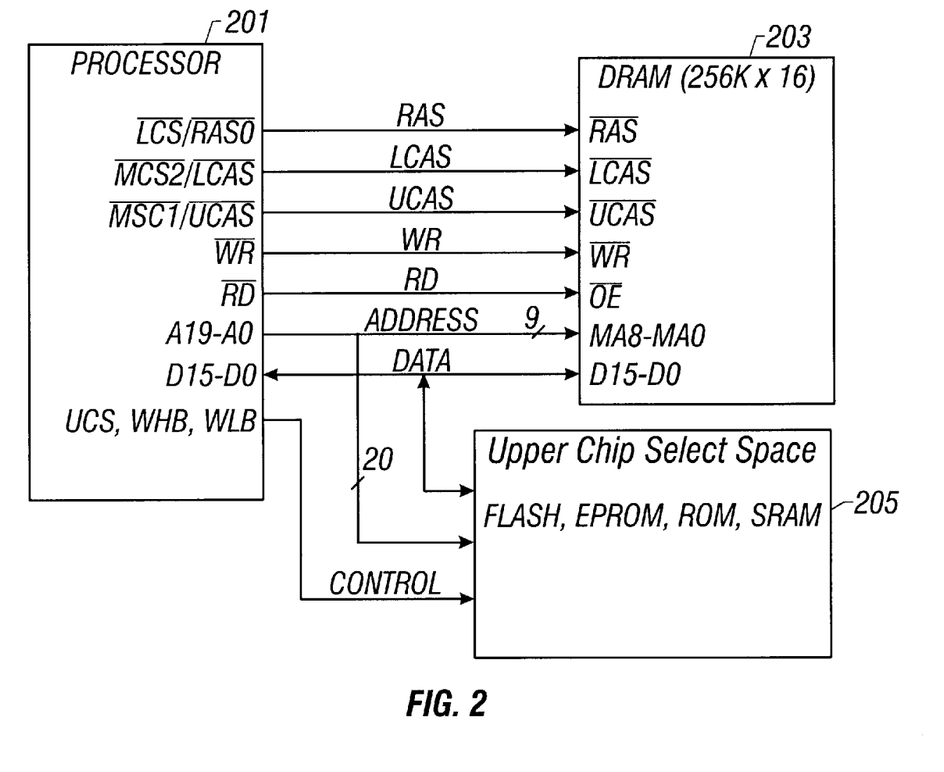
FIG. 2 shows an implementation of the present invention using a '186 processor.

FIG. 2 shows a system according to the invention that is implemented utilizing a '186 compatible microcontroller (i.e., compatible with the 80186 microcontroller). Details of a '186 microcontroller can be found in the Advanced Micro Devices data sheet for the AM186™ES (Publication # 20002; Rev. A; Amendment/0; Issue Date: January 1996), which is incorporated herein by reference. Processor 201 is coupled to DRAM 203 which is a 512 Kbyte (256K word) DRAM. The processor accesses DRAM 203 when the lower 512K address space is configured as DRAM space. It is assumed that the processor of FIG. 2 includes DRAM capability, i.e., the capability to provide the appropriate control signals to interface with DRAM. In one embodiment, such capability is accomplished by converting, the Lower Memory Chip Select (LCS) signal, which may be active during an access to addresses within the lower 512 Kbytes of memory, into a RAS signal. The column strobes are provided by the Midrange Memory Chip Selects ($\overline{MCS}$ 2 and $\overline{MCS}$ 1) which convert, respectively, to $\overline{LCAS}$ and $\overline{UCAS}$. $\overline{LCAS}$ asserts for a low byte access. $\overline{UCAS}$ asserts for a high byte access. Both assert for a word access. Internal control registers may be provided to designate the lower and upper memory block size and whether they are designated as DRAM address space. In FIG. 2, the lower and upper memory block size are both 512 Kbytes. The upper 512 Kbytes 205 in FIG. 2 can be utilized by memories such as Flash, EPROM, ROM, SRAM which do not require a multiplexed address bus.

The determination whether to assert the RAS and CAS signals is based on the value of the address internal to the processor. For instance, the processor detects if the lower address space is being selected, and if that space is designated as DRAM, the RAS/CAS strobes are asserted appropriately.

Figure 3:
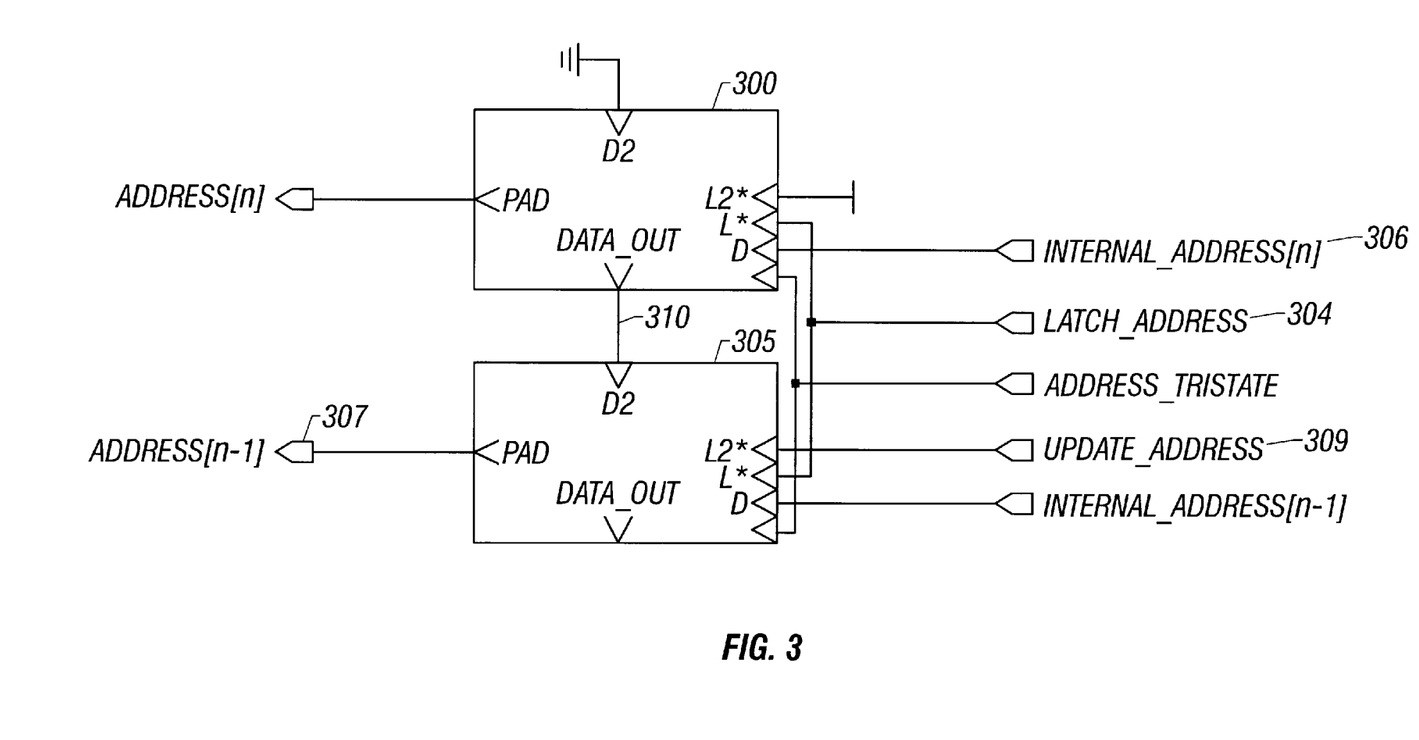
FIG. 3 shows output blocks used to implement the present invention.

FIG. 3 shows a block diagram of output circuits that can be utilized to implement the present invention. The output circuits function to multiplex an address bit with its nearest neighbor to provide row and column addresses. Block 305 provides output address (n−1) and is physically coupled to a DRAM address pin. Block 300 outputs address bit (n) but is not coupled to the DRAM. However, block 300 outputs internal address (n) as an address to a device or devices that do not have a multiplexed address. Block 300 also provides the address (n) over signal line 310 to block 305. Latch_ Address signal (L*) functions as a strobe which outputs row addresses for the RAS cycle. Thus, when L* is asserted and appropriate clocks (not shown) are provided, the internal address (n−1) is output from block 305 onto address pin 307. The update address signal 309 (L2*) functions as a strobe which outputs column addresses. Thus, L2* functions as a multiplexer select by selecting the D2 data received from block 300 (address bit n) for output on pin 307.

A pair of identically configured blocks 300 and 305 are provided for every pair of output bits. Thus, for a processor providing 20 address bits, 10 such pairs would exist. Thus, the processor could provide 20 odd/even multiplexed address bits on the 10 signal lines. In another embodiment, block 305 could be connected at 310 to its immediate neighbor below rather than above it. That is, block 305 could output (n+1) when L* is asserted rather than (n−1). The result of such an embodiment is shown in Table 3a. Additional variations of the circuit in FIG. 3 would be apparent to one of ordinary skill in the art. For instance, block 305 could be configured to output address n as a row address while latching address (n−1) to be output as the subsequent column address.

Figure 4:
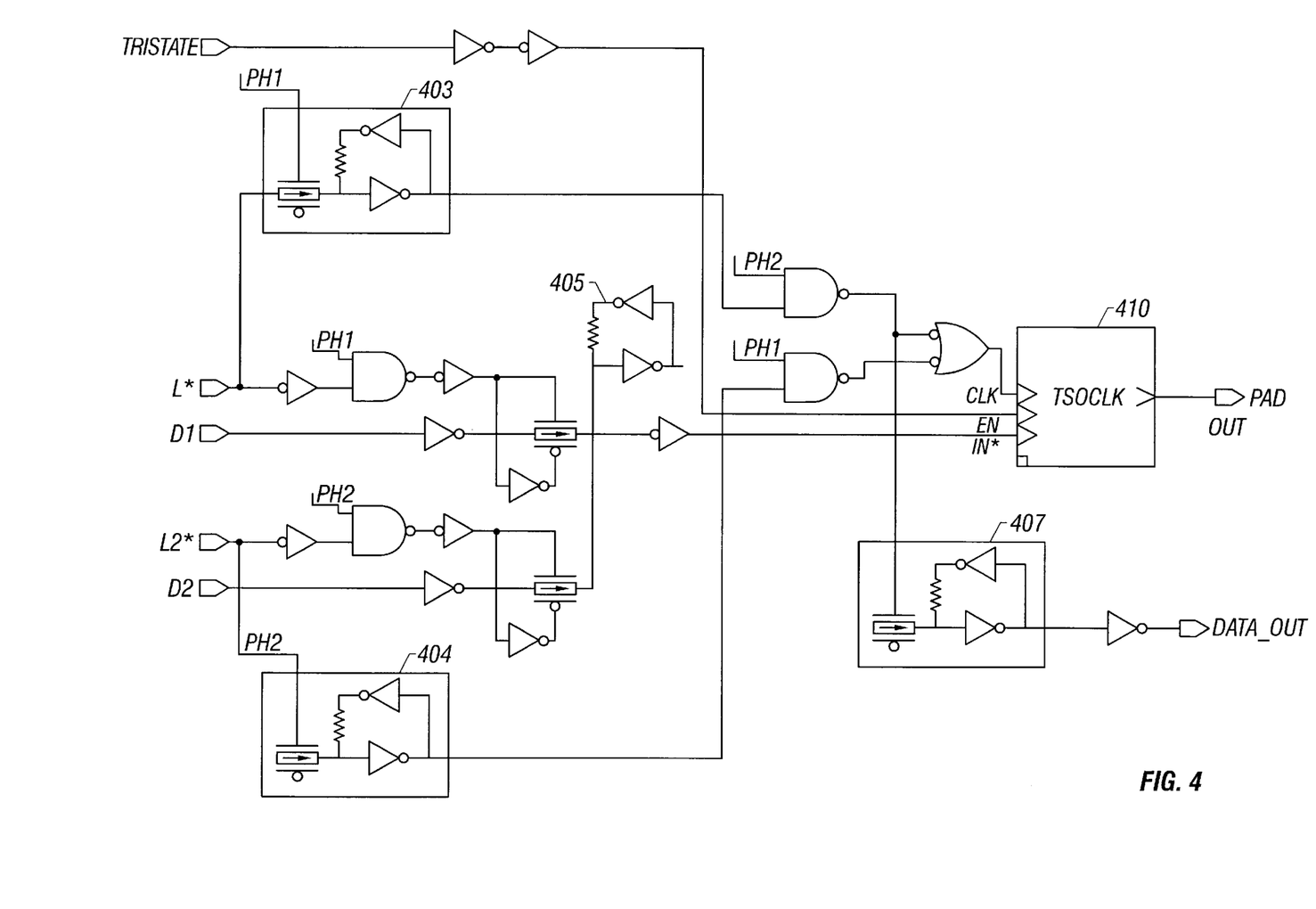
FIG. 4 shows further details of the output block.
Figure 5:
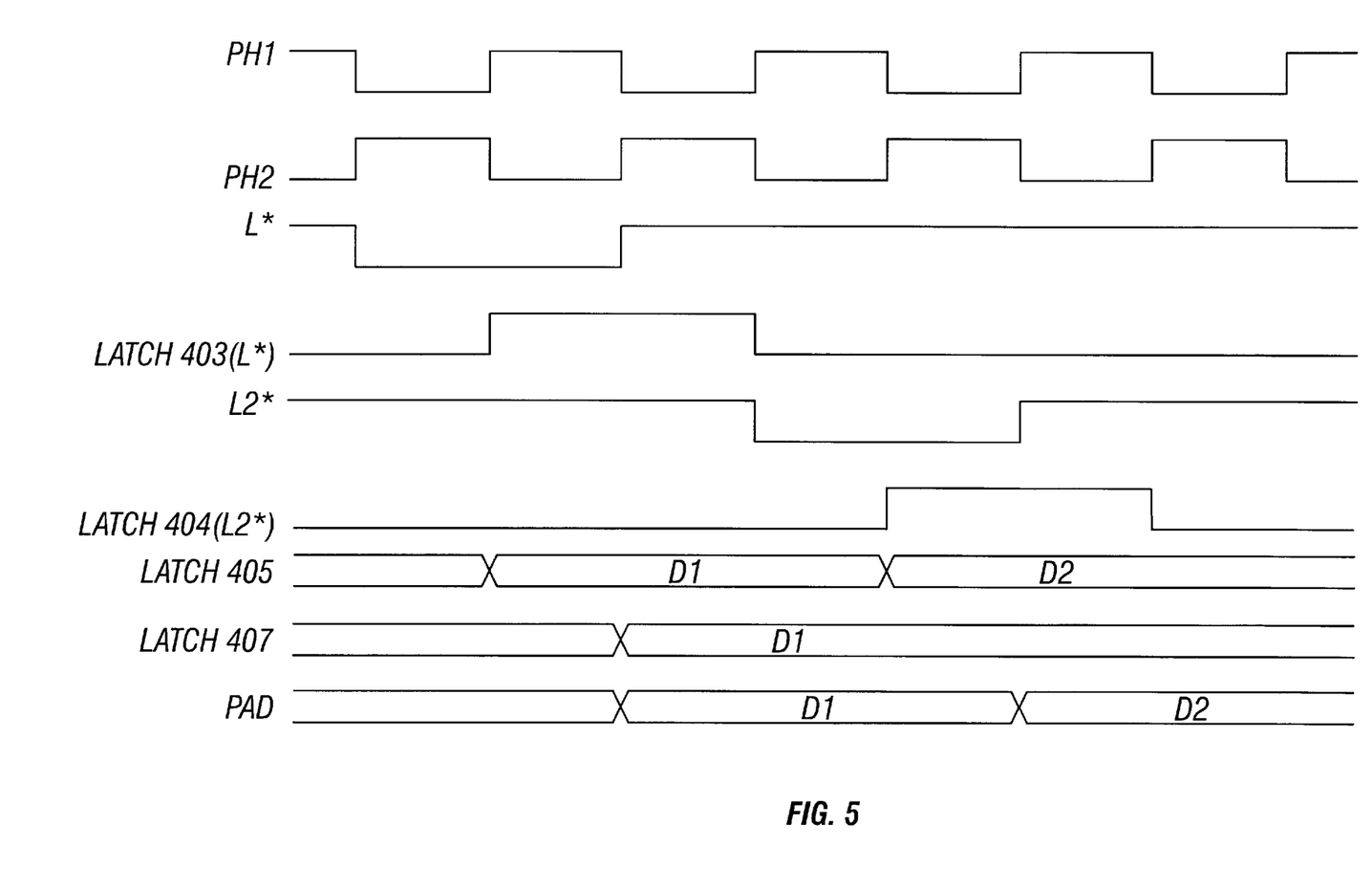
FIG. 5 shows a timing diagram of the output block of FIG. 4.

FIG. 4 shows in greater detail of one implementation of the block 305 (which is integrally the same as block 300). D1 corresponds to address (n−1) of FIG. 3. PH1 and PH2 are clock inputs. During a first time period, the output cell 410 will drive D1 and during a second time period the output cell 410 will drive D2. A representative timing diagram of the operation of the logic shown in FIG. 4 is provided in FIG. 5. FIG. 5 shows the values in latch 403, which latches in L* (the strobe for the RAS cycle), latch 405, latch 404, which is L2* latched, and latch 407 which provides DATA_OUT to its neighbor block D2 input.

Figure 6A:
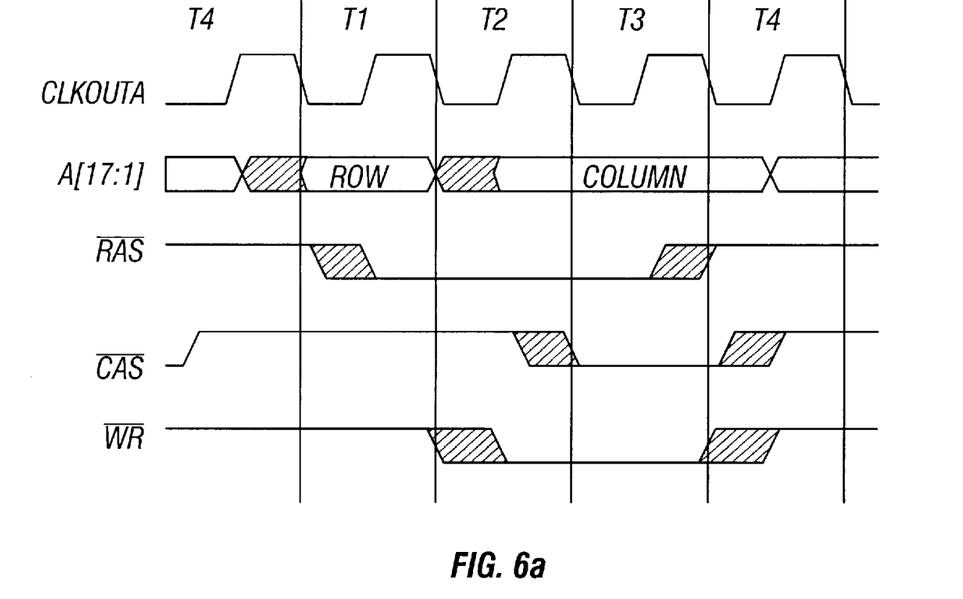
FIG. 6 shows an example of a DRAM read and write timing diagram.
Figure 6B:
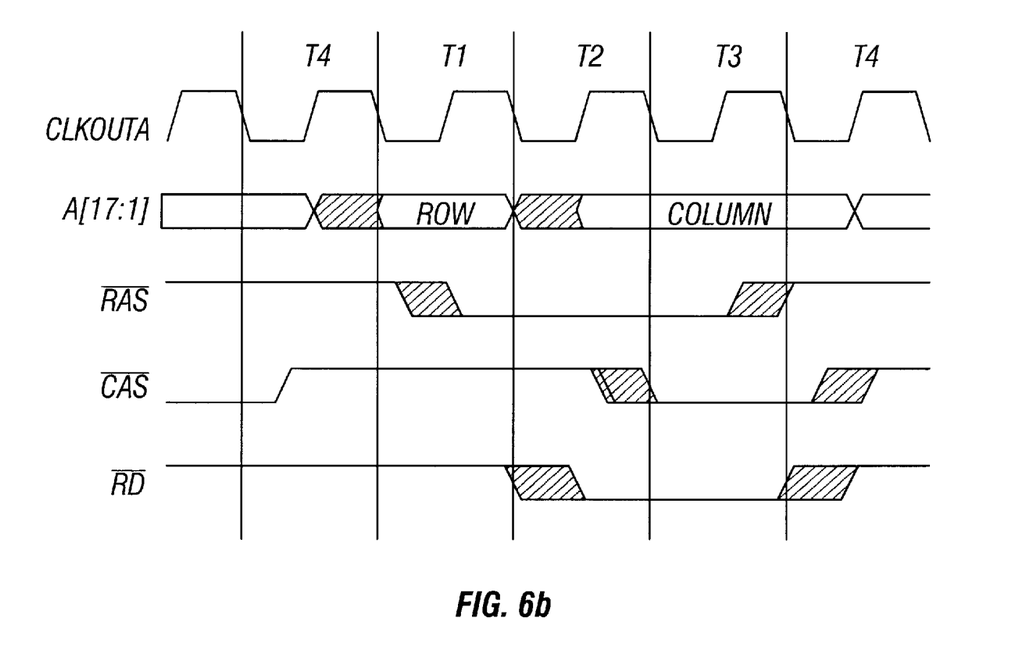

A timing diagram showing one example of DRAM write and read cycle timing driving the odd/even multiplexed row and column addresses according to the present invention is shown in FIG. 6.

For 186 implementations, it may be better to multiplex in column addresses onto the row pins, because that allows the SRAM address and the row address of the DRAM to be driven without having to know in what address space (e.g., upper or lower) the address resides. That is, the decode of the address can take place while the row address is being driven. This allows the addresses for DRAMs and SRAMs to be output as soon as the address is available.

Page mode DRAM and Extended Data Out (EDO) DRAM, provide the capability of multiple accesses to a page in the DRAM. A page is defined by the addresses in the row address. By toggling the CAS, a new set of column addresses can be accessed in the DRAM. If the row address that is currently in the DRAM (latched in with the falling edge of RAS) is compared with the row address of the next address, then the next address is on the page (as opposed to across a page boundary), if the two row addresses match. The new access can then be accomplished by providing the different column address bits. The new access can be accomplished in less time because you don't need to bring the RAS back high for the specified RAS high time, latch in the row address in and then latch the column address. In page mode, only the column address needs to change. A common application of this capability is in DMA, where the accesses are generally known to be linear and CPU "bursting" where a set number of sequential words are accessed to fill a cache line (usually 4 words). The advantage is that burst from the DRAM is faster than individually accessed addresses. Specifically, a DRAM in burst mode can typically provide 4 words in 7 or 10 clocks (depending on the burst interface). Without burst mode, the same 4 words, when accessed individually, require 16 clocks.

With the odd/even multiplexed addressing of the present invention, the row and column addresses latched into the DRAM are not sequential. The next sequential word in the linear address space is likely to be on another page. However, by slightly modifying the odd/even addressing scheme to include some sequential addressing, it is possible to get most of the benefit of the odd/even address multiplexing and still get the sequential bursting on a page.

For example, one common bursting scenario is a cache burst that will load 4 sequential words at a time. So A1 and A2 (the LSBs) will start at either 00, 01, 10 or 11 and then sequence through the other three. For the multiplexed odd/ even scheme, going from 01 to 10 or 11 to 00 would mean a new page (i.e., a new row address) because A1 and A2 are multiplexed together. Since the minimum number of address bits for any DRAM is greater than 4, the odd/even multiplexed address approach can be modified to support bursting as shown Table 4:

TABLE 4

| DRAM PIN | MA8 | MA7 | MA6 | MA5 | MA4 | MA3 | MA2 | MA1 | MA0 |
|---|---|---|---|---|---|---|---|---|---|
| PROC PIN | A17 | A15 | A13 | A11 | A9 | A7 | A5 | A4 | A3 |
| ROW | A17 | A15 | A13 | A11 | A9 | A7 | A5 | A4 | A3 |
| COLUMN | A18 | A16 | A14 | A12 | A10 | A8 | A6 | A2 | A1 |

Now the Row address can be latched in and the A1 and A2 address bits can be sequentially incremented resulting in sequential series of column addresses. As required, the number of sequential column pins may be increased to support increased burst access. For example, to support a burst of 16, the modified odd/even multiplexed address is shown in Table 5.

TABLE 5

| DRAM PIN | MA8 | MA7 | MA6 | MA5 | MA4 | MA3 | MA2 | MA1 | MA0 |
|---|---|---|---|---|---|---|---|---|---|
| PROC PIN | A17 | A15 | A13 | A11 | A9 | A7 | A5 | A4 | A3 |
| ROW | A17 | A15 | A13 | A11 | A9 | A8 | A7 | A6 | A5 |
| COLUMN | A18 | A16 | A14 | A12 | A10 | A4 | A3 | A2 | A1 |

The addressing of Table 5 supports bursting 16 addresses since A1–A4 are provided as the LSBs of the column address. However, it is still convenient to connect DRAMs of different sizes because the most significant bits are simply left unconnected as appropriate for the size of the DRAM. Thus, the invention provides the advantages of bursting and the advantage of the multiplexed odd/even addresses.

The description of the invention set forth herein is illustrative, and is not intended to limit the scope of the invention as set forth in the following claims. For instance, while the invention has been generally described in terms of a '186 implementation, the invention is also applicable to other processors which have limits on their addressing capability. Variations and modifications of the embodiments disclosed herein, may be made based on the description set forth herein, without departing from the scope and spirit of the invention as set forth in the following claims.

What is claimed is:

1. A processor comprising:
   a first output means, receiving address bit $A_n$, for providing a first line of an address bus with the address bit $A_n$ and for providing the address bit $A_n$ to a second output means; and
   the second output means for receiving the address bit $A_n$ from the first output means and an adjacent address bit, and for outputting to an adjacent line of the address bus the adjacent address bit during the one time period and the address bit $A_n$ during another time period, the address bit $A_n$ being part of one of a row address and a column address and the adjacent address bit being part of the other of the row address and the column address.

2. An integrated circuit comprising:
   a first and second plurality of output circuits coupled to drive an address bus connected to the integrated circuit;
   each of the first plurality of output circuits being coupled to a respective one bit of a first group of address bits, the first group of address bits being every other address bit of a first sequential group of address bits, beginning with address $A_n$, the first plurality of output circuits being coupled to provide the first group of address bits to every other line of a sequential portion of the address bus; and
   each of the second plurality of output circuits being coupled to a respective one of the first plurality of output circuits to receive a respective one of the first group of address bits and being coupled to receive a respective one of a second group of address bits, the second group of address bits being every other address bit of the first sequential group of address bits, beginning with address $A_{n+1}$, thereby providing each of the second plurality of output circuits with one even and one odd address bit, the one even and odd address bits being sequential, the second plurality of output circuits being coupled to address lines of the address bus which are not coupled to the first plurality of output circuits, thereby providing a non-multiplexed address from the first and second plurality of output circuits and a multiplexed address from the second plurality of output circuits.

3. The integrated circuit as recited in claim 2 wherein each of the second plurality of output circuits includes a selector circuit selecting one of an address bit of the second group and an address bit of the first group, according to a selection indication, the second plurality of output circuits providing the second group of address bits during a first time period and the first group of address bits during a second time period.

4. The integrated circuit as recited in claim 3 wherein the second group of address bits are provided as row addresses and the first group of address bits are column addresses.

5. The integrated circuit as recited in claim 3 further comprising:
   a third plurality of output circuits each output circuit respectively coupled to one of a third group of address bits, the third group being part of a second sequential group of address bits, the third group of address bits being sequential;
   a fourth plurality of output circuits, each coupled to one of the third group of address bits and coupled to one of a fourth group of address bits, the fourth group being part of the second sequential group of address bits, the fourth group of address bits being sequential; and
   wherein the first and second sequential group of address bits represent an address for a memory location; and
   wherein each of the fourth plurality of output circuits is coupled to a respective one of the third plurality of output circuits to receive the respective one of the third group of address bits.

6. The integrated circuit as recited in claim 5 wherein each of the fourth plurality of output circuits includes a selector circuit selecting one of an address bit of the third group and an address bit of the fourth group, according to a selection indication, the fourth plurality of output circuits providing the fourth group of address bits during the first time period and the third group of address bits during the second time period.

7. The integrated circuit as recited in claim 6 wherein the third group of address bits are least significant bits of the address for the memory location.

8. The integrated circuit as recited in claim 2 wherein each of the first plurality of output circuits includes a latch storing the respective one bit of the first group of address bits, and wherein respective ones of the second plurality of output circuits are coupled to respective latches in the first group of address circuit to receive the one bit of the first group of address bits.

9. The integrated circuit as recited in claim 8 wherein each of the first group of output circuits provides its respective bit of the first group of address bits to the address bus and to the latch at substantially the same time.

10. The integrated circuit as recited in claim 2 wherein each of the first and second plurality of output circuits includes a selector circuit.

11. A method comprising the steps of:

providing each of a first plurality of output circuits with a respective one of a first group of address bits, the first group of address bits being every other address bit of a first sequential group of address bits, beginning with address $A_n$;

providing the first group of address bits from the first group of output circuits to every other line of an address bus; and providing each of a second plurality of output circuits with one of the first group of address bits from a respective one of the first plurality of output circuits and a respective one of a second group of address bits, the second group of address bits being every other address bit of the sequential group of address bits, beginning with address $A_{n+1}$, thereby providing each of the second plurality of output circuits with one even and one odd address bit, the one even and odd address bits being sequential, the second plurality of output circuits being coupled to particular address lines of the address bus which are not coupled to the first plurality of output circuits; and providing the address bus from the output of the second plurality of output circuits with the first group of address bits during a first time period and the second group of address bits during a second time period.

12. A method as recited in claim 11 further comprising the steps of:

providing each of a third plurality of output circuits with a respective one of a third group of address bits, the third group of address bits being a sequential group of address bits of a second sequential group of address bits, the first and second sequential group of address bits providing an address location in a DRAM;

providing each of a fourth plurality of output circuits with one bit of the third group of address bits from a respective one of the third plurality of output circuits and a respective one of a fourth group of address bits, the fourth group of address bits being sequential bits of the second sequential group of address bits, the fourth plurality of output circuits being coupled to address lines of the address bus which are not coupled to the first, second and third plurality of output circuits; and providing the address bus with the third group of address bits during the first time period and the fourth group of address bits during the second time period.

13. A method as recited in claim 12 wherein the first time period provides one of a row address and a column address and the second time period provides the other of the row address and the column address.

14. A processing system comprising:

a processor including, a first plurality of output circuits, each output circuit coupled to a respective one of a first group of address bits, the first group of address bits being every other address bit of a sequential group of address bits, beginning with address $A_n$, the first group of output circuits providing the first group of address bits to every other line of a sequential portion of an address bus;

a second plurality of output circuits, each coupled to a respective one of the first plurality of output circuits to receive one bit of the first group of address bits and a respective one of a second group of address bits, the second group of address bits being every other address bit of the sequential group of address bits, beginning with address $A_{n+1}$, thereby providing each of the second plurality of output circuits with one even and one odd address bit, the one even and odd address bits being sequential, the second plurality of output circuits being coupled to address lines of the address bus which are not coupled to the first plurality of output circuits; and a first memory device coupled to the second plurality of output circuits, the first memory device receiving a multiplexed address over the second plurality of output circuits.

15. The processing system as recited in claim 14 further comprising a second memory device coupled the first and second plurality of output circuits, the second memory device receiving a non-multiplexed address over the first and second plurality of output circuits.

16. The processing system as recited in claim 15 wherein the first memory device is of a dynamic random access memory and the second memory device is one of a static random access memory and a non-volatile memory.

17. An integrated circuit comprising a first and second group of output circuits, each of the first group of output circuits being coupled to receive a respective one of a first group of internal address signals and the second group of output circuits coupled to receive respective ones of the first group of internal address signals from a latch in each of the first group of output circuits and respective ones of a second group of internal address signals at different times, the first and second group of output circuits providing a non multiplexed address and the second group of output circuits providing a multiplexed address.

* * * * *